Nov. 12, 1968
E. V. JACKSON
3,410,637
MECHANICAL MOUNTING FOR INTERPUPILLARY
DISTANCE MEASUREMENT INSTRUMENT
Filed March 31, 1965
2 Sheets-Sheet 1
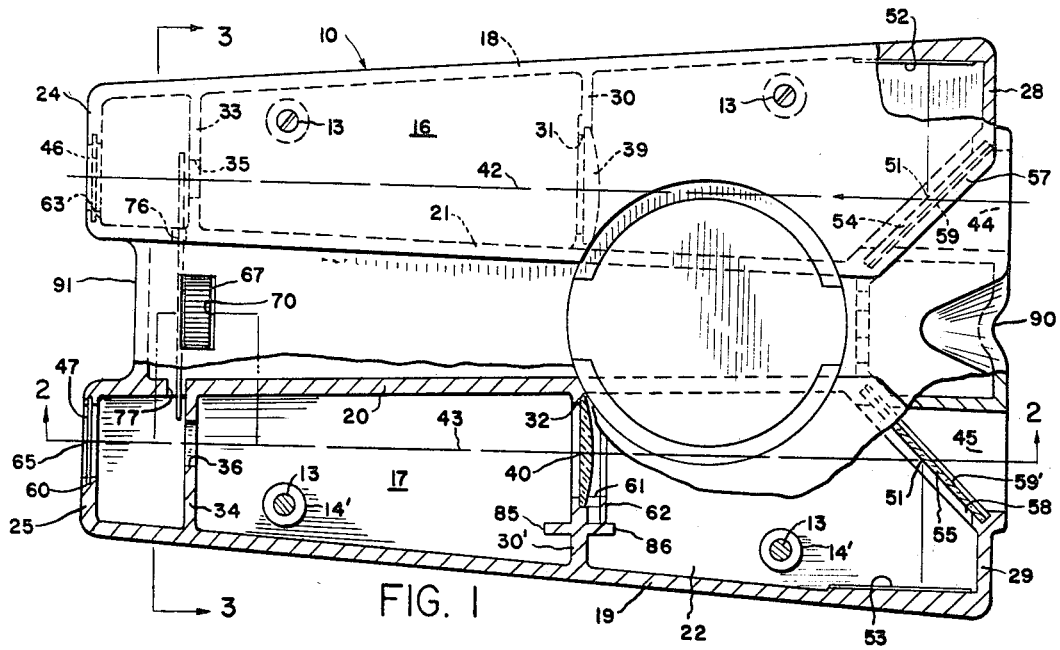
FIG. 1
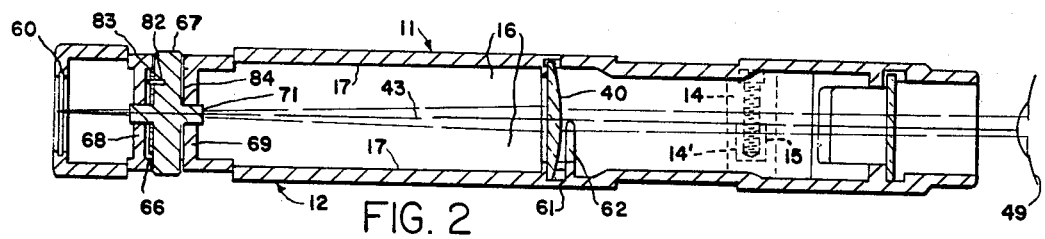
FIG. 2
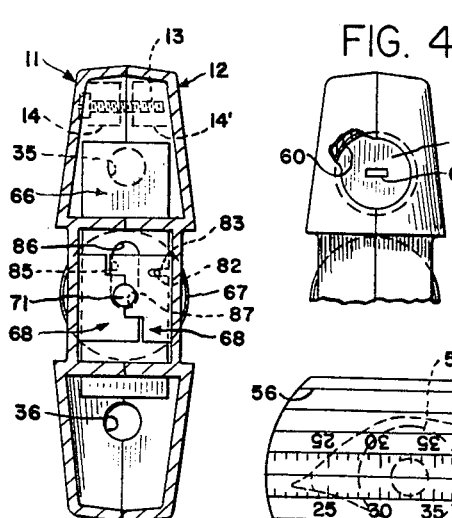
FIG. 3
FIG. 4
FIG. 6
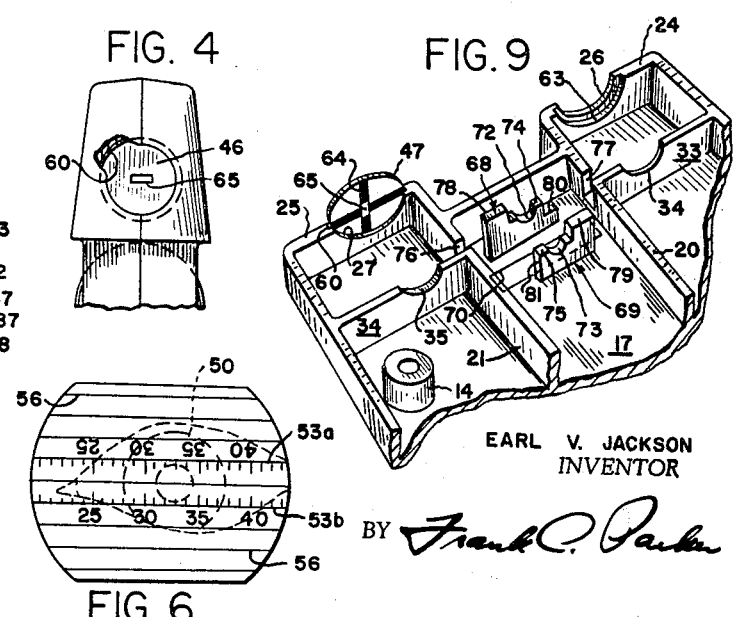
FIG. 9
EARL V. JACKSON
INVENTOR
BY Frank C. Parker
ATTORNEY Nov. 12, 1968

E. V. JACKSON 3,410,637

MECHANICAL MOUNTING FOR INTERPUPILLARY
DISTANCE MEASUREMENT INSTRUMENT

Filed March 31, 1965

EARL V. JACKSON
INVENTOR

BY Frank C. Parker

ATTORNEY

United States Patent Office 3,410,637
Patented Nov. 12, 1968

3,410,637
MECHANICAL MOUNTING FOR INTER-PUPILLARY DISTANCE MEASUREMENT INSTRUMENT
Earl V. Jackson, Penfield, N.Y., assignor to Bausch & Lomb Incorporated, Rochester, N.Y., a corporation of New York
Filed Mar. 31, 1965, Ser. No. 444,267
3 Claims. (Cl. 351—5)

ABSTRACT OF THE DISCLOSURE

A combined interpupillary distance gage and pupil diameter measuring device having a housing which is composed of duplicate top and bottom interfitting parts which are symmetrically designed about a center longitudinal axis so that these parts are interchangeable with each other.

---

Figure 7:
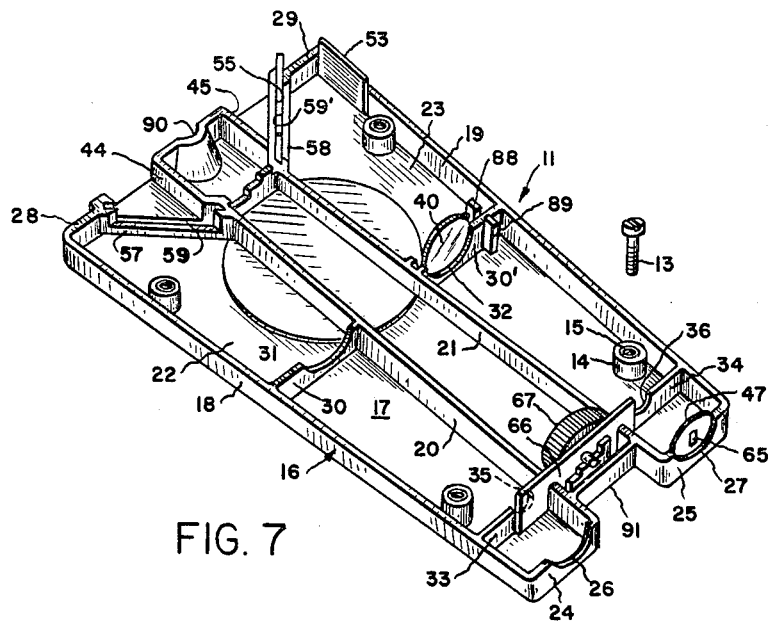

The present invention relates to an ophthalmic instrument for measuring the eye position and size of a patient's eyes and more particularly relates to improvements in an instrument known as an interpupillary distance gage.

Although interpupillary gages of various kinds and capabilities have been in use for many years, the considerable increase in eye care in recent years has resulted in a commensurate increase in the demand for a low-cost instrument which is versatile and accurate in use within the needs of modern optometry.

It is an object of the present invention to provide an interpupillary distance gage which is simple and strong in construction while being versatile and accurate in operation, particularly with regard to the avoidance of parallax in obtaining readings of the semi-interpupillary distance, the pupil diameter, and the corneal diameter.

A further object of the invention is to provide a dust-tight casing in which all of the optical parts are adequately protected from soiling and damage, the casing and its functional parts furthermore being constructed so that ambient light provides the necessary illumination which is transmitted through the casing.

It is a further object to provide such a device which is comparatively small and of light weight so that it is easily portable and requires little room in an instrument cabinet.

A still further object is to provide such a device wherein two substantially duplicate subassemblies are assembled together to provide a complete interpupillary distance gage, the parts thereof being ingeniously constructed and interfitted to secure good reliability of the mechanical alignment structure so that continued excellent optical performance is assured, and the cost of producing and servicing the device is reduced to a minimum thereby.

Further objects and advantages reside in the combination and arrangement of the parts hereof and in the constructional details, reference being had to the following specification and accompanying drawings for a complete disclosure of the present invention.

Figure 8:
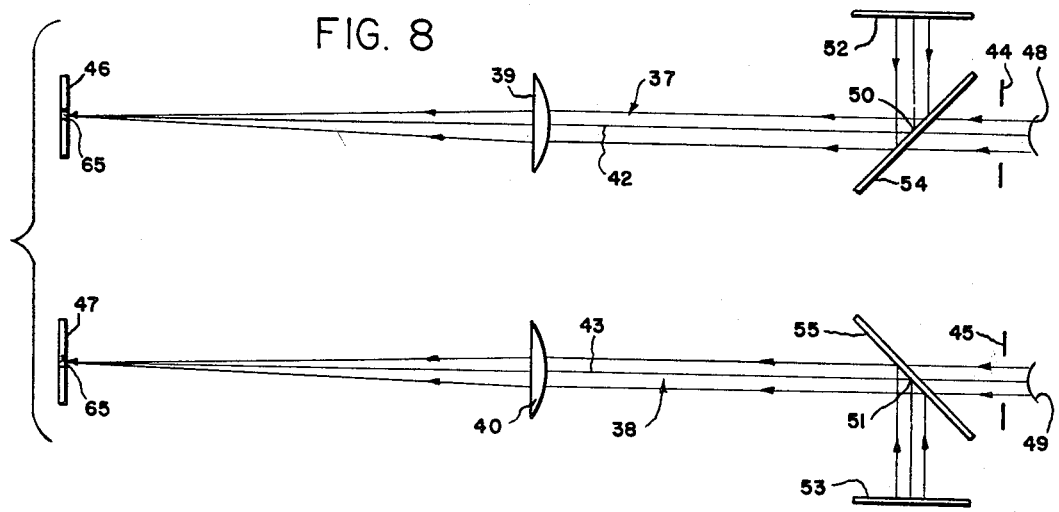
Figure 5:
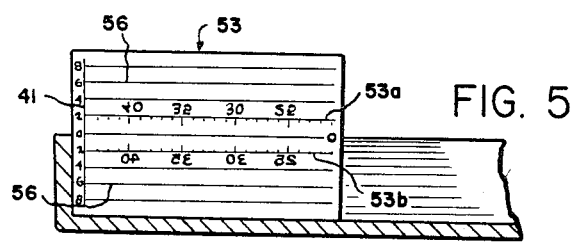

In the drawings:
FIG. 1 is a plan view of a successful form of the present invention as completely assembled, certain parts being broken away and shown in section;
FIG. 2 is a vertical section taken on the broken line 2—2 of FIG. 1;
FIG. 3 is a horizontal section taken on the line 3—3 of FIG. 1;
FIG. 4 is a partial end view of the operator's end of said gage, part of said view being broken away and shown in section;

FIG. 5 is a partial sectional view in side elevation of certain constructional details of the instrument;
FIG. 6 is a somewhat schematic view of the patient's eye and the scale mechanism as seen by the operator;
FIG. 7 is a perspective view of one of the two subassemblies constituting the instrument;
FIG. 8 is a diagrammatic view of the optical system forming a part of the present invention; and
FIG. 9 is an enlarged perspective view of the operator's end only of one of the subassemblies shown broken away.

In FIG. 1 of the drawings, certain novel features of the present invention are partially noticeable such as ruggedness and neat streamlined appearance as well as compactness and simplicity, the interpupillary distance gage being represented generally by numeral 10.

One of the outstanding mechanical features of the gage 10 is the two-part construction consisting of two substantially identical subassemblies 11 and 12, FIG. 2, one of which is shown per se in FIG. 7. Such a construction effects a sizeable reduction in cost of parts, cost of assembly and inspection, and favorably affects servicing operations. The two subassemblies are preferably held together by a plurality of countersunk screws 13 which extend through holes in a plurality of bosses 14 formed on the interior surface of a base wall 17 in one subassembly and engage in threaded companion bosses 14' formed in the other subassembly, as shown in FIGS. 2 and 3.

With particular reference to FIG. 7 of the drawings, each subassembly 11 or 12 is designed as a symmetrical interfitting part so that one subassembly may be inverted and may engage perfectly with the other to provide a complete substantially dust-tight housing for the optical systems.

Of particular advantage in simplifying the construction and making the interpupillary gage self-contained is the fact that illumination of the operating interior parts of the instrument is provided by forming the casing portion of at least one of said subassemblies of light-transmitting material such as the organic plastics, preferably the material known by the tradename of Polystyrene.

One such casing is designated by numeral 16 and comprises a base wall 17 on which is integrally formed peripherally a pair of side walls 18 and 19 in an erect position. Between side walls 18 and 19 on the base wall 17 are integrally longitudinally formed a pair of interior or interposed longitudinal erect walls 20 and 21 which together with the outer walls define a pair of parallel sight chambers 22 and 23 containing the optical systems. Across the operator's end of the sight chambers are integrally formed on the base wall 17 a pair of coplanar end walls 24 and 25 wherein a pair of semi-circular openings 26 and 27 are formed. At the patient's end of the instrument, the sight chambers are closed partially by a pair of coplanar erect end walls 28 and 29 which are formed integrally on the base wall 17 as best shown in FIG. 7.

About halfway along each of said sight chambers 22 and 23 are formed aligned intermediate cross walls 30 and 30' respectively wherein a pair of semi-circular openings 31 and 32 respectively are formed as best shown in FIG. 7. Further toward the operator's end of the instrument, a second pair of cross walls 33 and 34 are formed across the sight chambers 22 and 23 integrally with said base wall 17. In the cross walls 33 and 34 are formed a pair of semi-circular openings 35 and 36 respectively which are longitudinally aligned as set forth hereafter.

Companion telecentric optical systems 37 and 38 are shown in FIG. 8 which are so designed that the image of a scale to be described hereinafter is superpositioned in the field of view of the practitioner on the eye of the patient without parallax effects.

In order to obtain this result, the optical systems 37 and 38 comprise positive lenses 39 and 40 respectively as shown in FIG. 8 having their respective optical axes 42 and 43 aligned with a pair of sight apertures 44 and 45 formed in the patient's end of the instrument, said apertures framing the patient's eyes as seen by the operator. In the walls 24 and 25 at the operator's end of the optical systems, a pair of aperture diaphragms 46 and 47 are provided aligned on the optical axes 42 and 43 respectively at a distance from the positive lenses 39 and 40 which is equal to the focal length thereof whereby parallel light entering said lenses is focused at said diaphragms. The patient's eyes are symbolically represented by the curved lines 48 and 49 in FIG. 8.

As described in the patent application of Irving B. Lueck, Serial No. 444,269 filed March 31, 1965, now abandoned, filed concurrently herewith and commonly assigned, the optical systems include a pair of duplicate scales or scale cards 52 and 53 which are provided for measuring the geometrical properties of the patient's eyes 48 and 49 and said scales are arranged to extend substantially parallel to and spaced laterally from the optical axes 42 and 43 so that the scales are removed from the respective fields of view. On the optical axes 42 and 43 are obliquely positioned at the points 50 and 51 a pair of beam dividers 54 and 55 which reflect an image of the respective scales 52 and 53 along their respective optical axes 42 and 43 toward said lenses. The axial distance from the points 50 and 51 to said scales is substantially equal to the axial distance from points 50 and 51 to the eyes 48 and 49 and both are conjugate to their respective aperture diaphragms 46 and 47. In this manner the telecentric optical systems 37 and 38 permit the scales 52 and 53 to be superimposed in effect on the patient's eyes 48 and 49 in such a manner that parallax is avoided.

Further with regard to the scales 52 and 53, each is formed on suitable cards in exactly the same manner as shown in enlarged detail in FIG. 5, and each card is secured preferably by cementing it in the same relative place against the vertical side wall 19 of its respective subassembly opposite the beam dividers 54 or 55 as shown in FIG. 7. It will be noticed that each subassembly 11 or 12 contains all of the optical elements necessary for only one of the two optical systems so that when the two subassemblies are put together, a complete instrument results.

Furthermore, each scale card 52 or 53 carries two scales as shown in enlarged detail in FIG. 5 and indicated by 53a and 53b, one scale being inverted with respect to the other so that the instrument may be used either side up so as to receive external light from above or below through the casing which is made of light-transmitting material. Both scales 53a and 53b read in descending order from left to right in FIG. 5 and a vertical scale 41 composed of a series of horizontal parallel lines 56 preferably located 2.0 mm. apart are provided on either side of a zero line 0 for the purpose of measuring the separation of upper and lower lids when fitting contact lenses. A further purpose is to measure the distance from the pupillary center to the lower lid when fitting multifocal lenses; also for measuring distance to upper lid margin when fitting double segment trifocals.

For mounting the aforesaid beam dividers 54 and 55 in their respective subassemblies 11 and 12, a pair of window or mounting frames 57 and 58 are formed obliquely and partially in each casing 16 so that when put together, a complete window frame results. Said partial frames are provided with a continuous groove 59 and 59' in the frames 57 and 58 respectively wherein the two beam dividers 54 and 55 are held preferably by cementing, only one beam divider being assembled in each subassembly 11 or 12.

As best shown in FIGS. 1 and 2 and as described in connection with the parallel optical systems 37 and 38, a pair of positive lenses 39 and 40 are provided which are mounted against the intermediate cross walls 30 and 30' and are centered against the apertures 35 and 36 therein, each lens being held in this position principally by cementing and a wedge 61 which is wedged under compression between the rim portion of the lens and an adjacent fixed wall 62 formed integrally with the base 17.

The aforementioned aperture diaphragms 46 and 47 are each fixed respectively in one of the subassemblies 11 and 12, and as best shown in the enlarged view in FIG. 9, the aperture diaphragm 47 is held in concentricity with the semi-circular opening 27 by suitable means such as cementing and/or forcing the edge portion thereof into a narrow accommodating crevice 60 formed in the end wall 25 around said opening. As seen in FIG. 9, the opposite corresponding groove 63 for accommodating the uncemented free half of the aperture diaphragm 46 is formed in the shape of a counterbored recess, open at one side to facilitate an easy fit and entry when the subassemblies are put together.

Another feature relates to the provision for mounting a fixation target 64 on the inside surface of each aperture diaphragm 46 and 47, the eyes of the patient being focused thereon during the examination. Said targets 64 are formed preferably as a black cross centered on the aperture 65 of the diaphragms whereby the aperture plate serves two purposes.

Since it is desirable for the practitioner to examine one eye at a time, a simple and effective shutter mechanism is provided therefor as shown in various details in FIGS. 2, 3, 7. A flat shutter plate 66 is clustered along with a thick and peripherally knurled operating disk 67 in the open space between a pair of upright stands 68 and 69 which are preferably integrally formed on the base wall 17 of each subassembly 11 and 12.

The operating disk 67 is provided with an axle or shaft 71 which is rotatably journaled at its opposite ends in semi-circular bearing seats 72 and 73 formed in the middle surface or level 74 and 75 of the stands 68 and 69 respectively. With the shaft 71 held on the bearing seats 72 and 73, the knurled portion of the operating disk 67 projects through a clearance opening 70 formed in the base wall 17 of each subassembly 11 and 12 so that the shutter may be easily moved from the exterior. Referring to FIG. 9, the shutter plate 66 stands erect in the vertical slots 76 and 77 formed in the longitudinal walls 21 and 20 respectively and is movable freely therein. The paired semi-circular seats 72 and 73 of each subassembly 11 and 12 cooperate to provide a complete set of bearings.

In order to assure reliable alignment of the halves of the paired bearing surfaces, a pair of elevated lugs 78 and 79 are formed respectively on the stands 68 and 69 higher than the middle surfaces 74 and 75. The inner flanks of lugs 78 and 79 engage a coresponding pair of vertical side faces 80 and 81 formed on said stands 68 and 69, respectively, when the subassemblies 11 and 12 are fitted together whereby relative lateral motions of subassemblies 11 and 12 are prevented.

As best shown in FIG. 3, the operating disk 67 is provided with a connecting pin 82 which is fixed therein so as to project into an open slot 83 formed in the edge of the shutter plate 66 so that rotation of the disk causes motion of the shutter to occlude either aperture 35 or aperture 36. If desired, a thin curled spring 84 may be inserted between the disk 67 and the stand 69, for instance, for applying frictional resistance to the motion of the shutter plate 66. In order to properly limit the occluding movement of the shutter plate 66, an elongated horizontal opening 85 having curved end abutment surfaces 86 and 87 is provided (FIG. 3), said opening straddling the shaft 71 so that said surfaces abut said shaft to limit said movement in either direction.

Other means for preventing relative longitudinal or transverse displacement of the subassemblies 11 and 12 are provided comprising an upright pair of alignment struts 88 and 89 which are formed at either side of each intermediate wall 32 near the outer wall 19 and are spaced apart by the thickness of the wall 32. Said struts 88 and 89 project above the wall 32 considerably so as to straddle and confine the mating wall of the other subassembly as it engages between the struts.

At the patient's end of the instrument, a nose recess or rest surface 90 is formed centrally between the sight openings 44 and 45 on both top and bottom surfaces for accommodation of the patient's nose and all of the semi-pupillary distances are measured from the midline of said recess. At the other end of the instrument another recessed clearance space 91 is provided for accommodation of the nose of the practitioner when his eyes are brought close to the diaphragms 46 and 47.

When the instrument 10 is held in operating position, the practitioner sees a view as shown in FIG. 6 wherein the pupillary distance scale is superimposed without parallax on the eye of the patient.

It will be observed that the proper alignment of all of the critical parts of the interpupillary distance gage follows a scheme wherein only the mating interior alignment elements serve the alignment function because relative shrinkage there is very small and untroublesome, the peripheral elements of each casing member not being fitted together with any such interlocking joints and connections so that differential shrinkage in these parts does no harm.

With the optical parts, such as the beam divider 55, lens 41, aperture diaphragm 47 and scale card 53 properly assembled in each subassembly 11 and 12 and the shutter plate 66 and drag spring 84 assembled in one of them, the subassemblies are fitted together and the screws 13 are engaged to clamp the parts together, no other operations being necessary to produce a complete instrument.

Although only a preferred form of the invention has been shown and described in detail, other modifications and forms are possible and changes may be made in the form and arrangement of the parts and substitutions may be made therein without departing from the spirit of the invention as defined in the claims appended hereto.

I claim:

1. An interpupillary distance gage for ophthalmic use composed of two structurally equivalent subassemblies which are fitted and clamped together along mating surfaces to form a complete device each subassembly comprising a casing member which is characterized by
   a nominally flat elongated base wall,
   a perimeter wall erectly formed around the periphery of said base wall so as to provide two opposite side walls and two interconnecting end walls,
   a substantially planar mating surface formed around the edge of said perimeter wall, the mating surface of one subassembly being fitted to match the corresponding mating surface of the other subassembly,
   two similar elongated continuous interior walls formed erectly and longitudinally on said base wall between said end walls in slightly diverging relation to said side walls so as to form a pair of longitudinal symmetrical diverging sight chambers therebetween,
   means forming a semi-circular recessed edge in said mating surfaces in the end wall at the narrower end of each one of said chambers,
   means for securing an aperture diaphragm cooperatively in the opening provided cooperatively by the aforementioned recessed edges,
   means forming a U-shaped slotted window frame in the base walls of each subassembly at the wider end of said chambers, the terminal part of said U-shaped frames terminating at said mating surfaces and being inclined at substantially 45° to said end wall,
   a semi-reflective transparent beam divider facing the adjacent side wall fitted into the slotted window frames provided for the support of the divider,
   an intermediate cross wall extending erectly across each of said chambers and having means therein forming an opening cooperatively wherein a positive lens is held in optical alignment between said diaphragm and the eyes to be examined at a distance of substantially the focal length of the lens from said diaphragm, and
   a scale constructed and arranged on the interior surface of each of said perimeter walls in optical alignment with said beam dividers so as to appear in the field of view of the operator.

2. An interpupillary distance gage according to claim 1 further characterized by
   a pair of upright mutually parallel bearing stands formed on said base wall of each subassembly between said sight chambers and parallel to a shutter supporting cross wall, said stands being spaced from each other at a distance substantially greater than the thickness of said shutter on opposite sides of the plane of the shutter supporting cross wall, a middle surface formed on each stand substantially coplanar with the mating surfaces of the aforesaid subassemblies, a pair of longitudinally aligned half bearing surfaces formed respectively in said middle surfaces on each subassembly so that upon assembly a complete bearing surface is provided,
   a shutter plate movable along a shutter supporting cross wall in the space between said stands, the length between the occluding ends thereof being substantially equal to the centerline distance between the aperture diaphragms, and the movement of said shutter being so proportioned as to cover only one aperture diaphragm at a time, and a rotatable member journaled on said bearing surfaces and having a thickness together with said plate which is slightly less than the distance between said stands so as to allow free motion thereof and operably connected for moving said shutter plate.

3. An interpupillary distance gage as set forth in claim 2 further characterized by
   a lug formed above said middle surface at one side of said half bearing surface on one of said stands, and a duplicate lug formed above said middle surface on the other side of said half bearing surface in the other one of said stands,
   a first vertical locating surface formed on the inner side of each lug so as to face each other, and
   a second vertical locating surface formed on each said stand below said middle surface and facing away from each other, the distance parallel to the base wall between the first vertical locating surfaces corresponding to the distance between the second vertical locating surfaces,
   whereby upon assembly the lug on one stand prevents relative motion in one direction of the two subassemblies while the lug on the other stand prevents said relative motion in the opposite direction.

References Cited

UNITED STATES PATENTS

| | | | |
|---|---|---|---|
| 2,242,723 | 5/1941 | Jobe | 351—5 |
| 2,477,518 | 7/1949 | Kappauf et al. | 351—5 |
| 2,484,591 | 10/1949 | Rochwitz | 350—139 |

OTHER REFERENCES

Hahn, Jan.: "Measuring the Pupillary Distance and Lens Centering"; The Optical Journal and Review of Optometry; vol. XCVII, No. 18; September 15, 1960. pp. 43, 46, and 48, Photocopy in 351/5.

DAVID SCHONBERG, *Primary Examiner.*

P. A. SACHER, *Assistant Examiner.*